United States Patent [19]

Holmes et al.

[11] 4,094,236

[45] June 13, 1978

[54] ICE-CREAM SANDWICH FORMING APPARATUS

[75] Inventors: Gordon W. Holmes, Mississauga; Roy W. Nelham, Cheltenham, both of Canada

[73] Assignee: R. Nelham & Associates Incorporated, Willowdale, Canada

[21] Appl. No.: 720,576

[22] Filed: Sep. 7, 1976

[51] Int. Cl.² ........................ A23P 1/00; B65G 59/06
[52] U.S. Cl. .................................. 99/450.4; 221/297
[58] Field of Search ........................... 99/450.1, 450.4; 221/190, 251, 297–298

[56] References Cited

U.S. PATENT DOCUMENTS

| 1,232,576 | 7/1917 | Berner | 99/450.4 |
| 1,524,420 | 1/1925 | Bohlman | 221/297 |
| 2,916,125 | 12/1959 | Wallberg | 221/298 |

Primary Examiner—Harvey C. Hornsby
Assistant Examiner—Robert Pous
Attorney, Agent, or Firm—Sim & McBurney

[57] ABSTRACT

An ice-cream sandwich is formed by dispensing individual rectangular edible wafers from a stack of face abutting wafers one at a time into a receptacle. After dispensing of the first wafer an ice-cream block is positioned on the first wafer and then a second wafer is dispensed onto the exposed face of the block to complete the sandwich.

4 Claims, 10 Drawing Figures

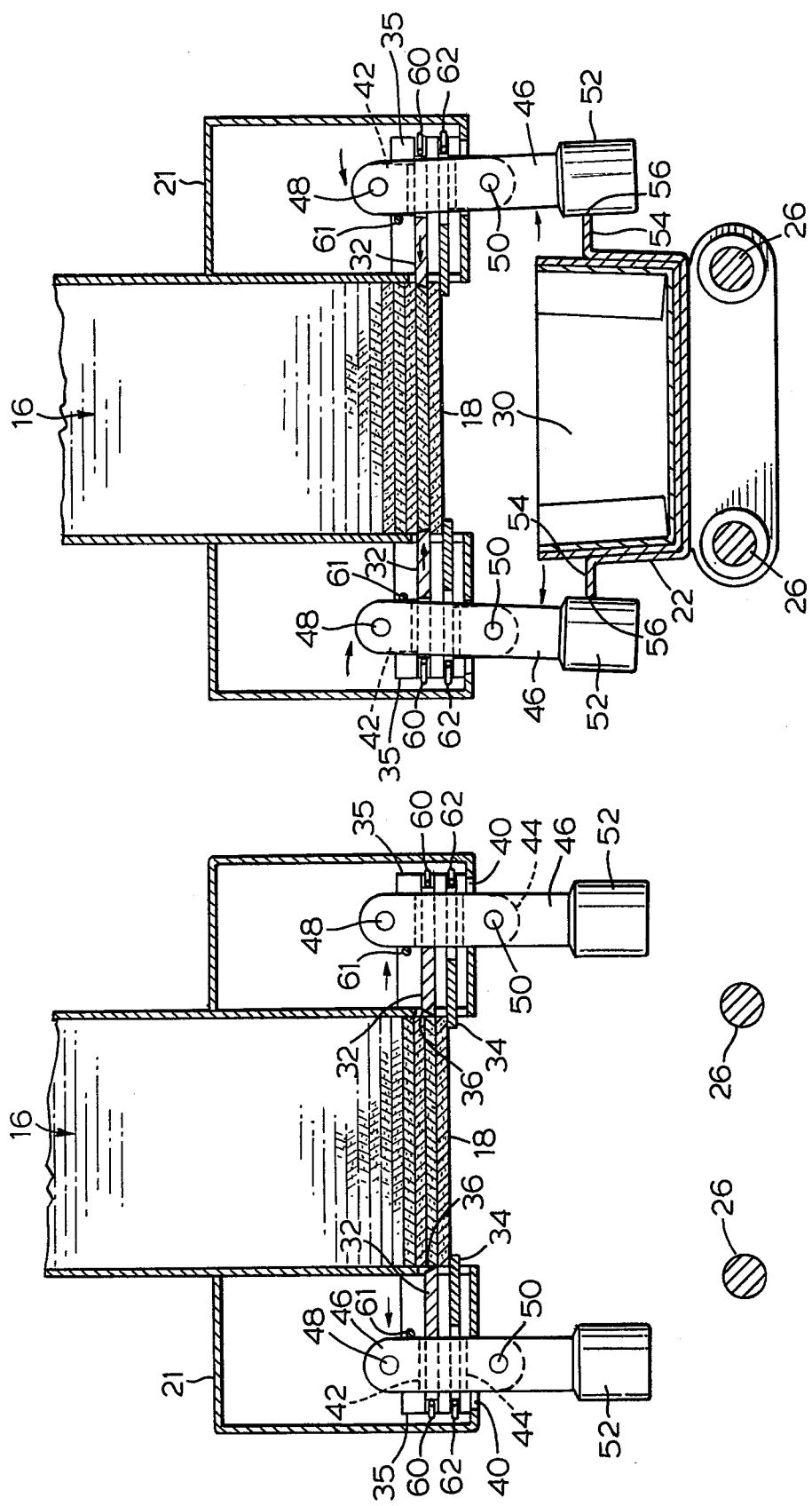

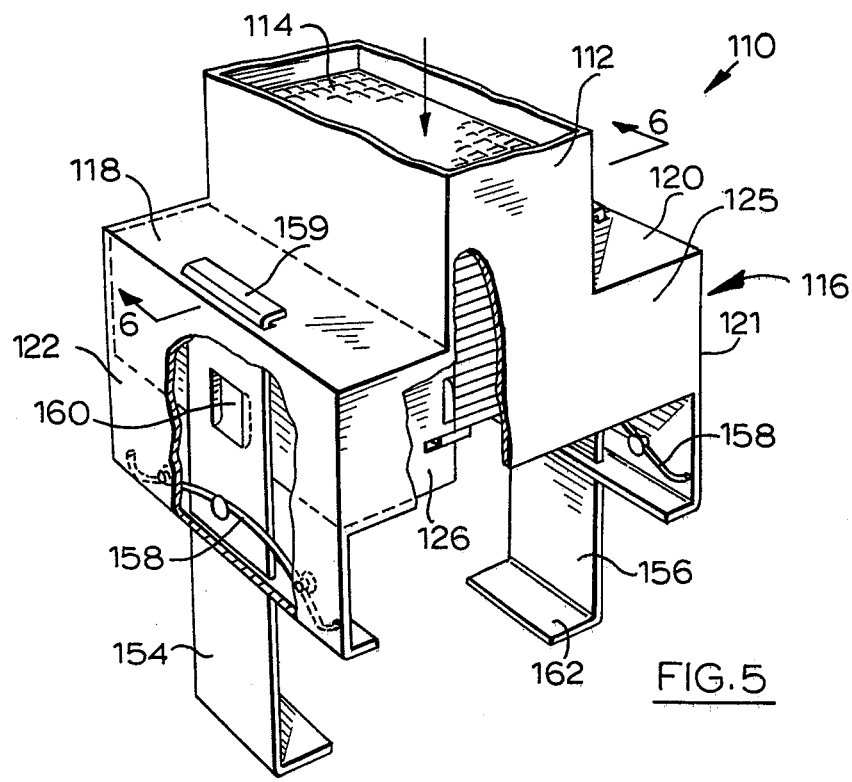
FIG. 5
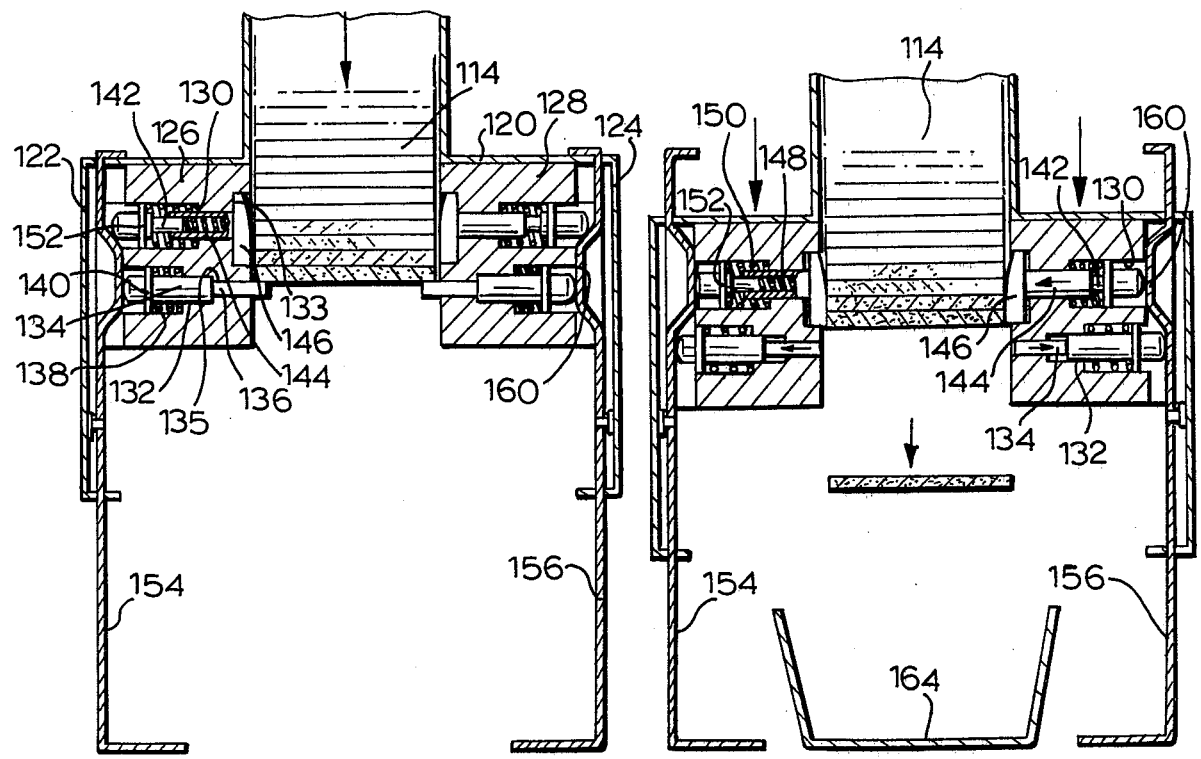
FIG. 6
FIG. 7

ICE-CREAM SANDWICH FORMING APPARATUS

FIELD OF INVENTION

This invention relates to the formation of ice-cream sandwiches.

BACKGROUND TO THE INVENTION

An ice-cream sandwich consists of a rectangular block of ice-cream positioned between two edible rectangular wafers of substantially the same dimension as the faces of the ice-cream block and which abut those faces.

Assembly of the sandwich from the ice-cream block and the wafers involves considerable handling which may not be hygienic. The present invention provides an assembly operation which minimizes handling.

SUMMARY OF INVENTION

In this invention, edible wafers are dispensed one at a time from a stack thereof, with the ice-cream block being positioned on one wafer before dispensing of a second wafer onto the exposed face of the block.

BRIEF DESCRIPTION OF DRAWINGS

FIG. 2 is a section taken on line 2—2 of FIG. 1 with the parts in the locations shown in FIG. 1;

FIG. 3 is the same section as FIG. 2 except that the receptacle holding tray has moved to an intermediate position.

FIG. 5 is a perspective view, with parts cut away, of a portable device in accordance with a second embodiment of the invention;

FIG. 6 is a section taken on line 6—6 of FIG. 5 showing the parts in a first position;

FIG. 7 is a section taken on line 6—6 of FIG. 5 showing the parts in a second position;

DESCRIPTION OF PREFERRED EMBODIMENTS

Figure 1:
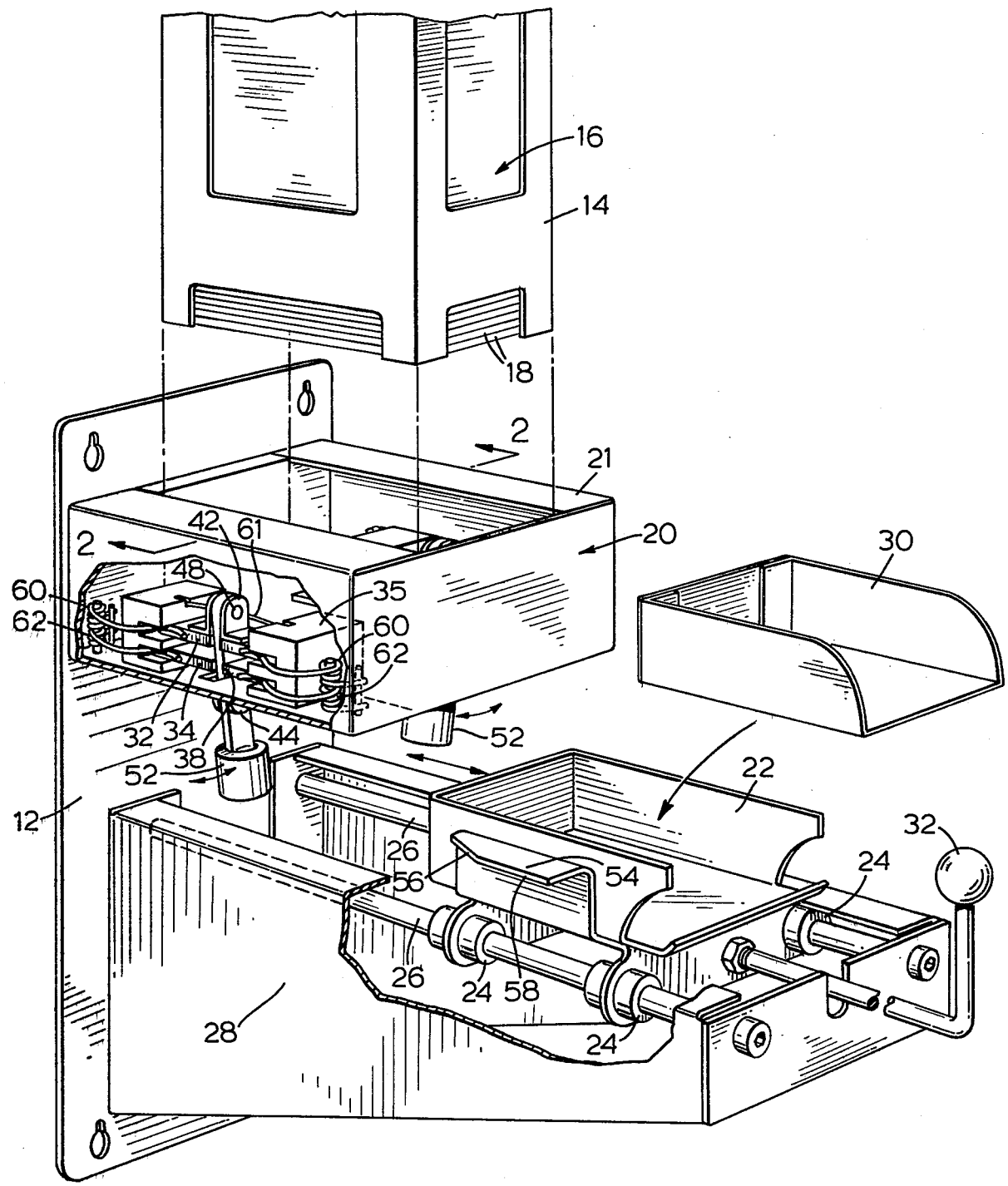
FIG. 1 is a perspective partly-exploded view with parts cut away of a device in accordance with one embodiment of the invention.

As seen in FIGS. 1 to 4, an ice-cream sandwich making machine 10 includes a vertical frame plate 12 for securing the machine to an upright support surface, such as a wall.

A wafer stack holding chute 14 contains a stack 16 of horizontally-extending individual rectangular edible wafers 18 in face abutting relationship. The chute 14 is received in the open top of a dispensing means 20 which is constructed for controlled dispensing of wafers 18 one at a time downwardly through the dispensing means 20. The dispensing means 20 includes a box-like frame 21 which is secured to the frame plate 12.

A receptacle holder tray 22 is mounted by collars 24 for sliding movement on horizontally-extending parallel rods 26 which extend perpendicularly away from the frame plate 12 and are mounted in a supporting body 28 secured to the frame plate 12. The receptacle holder tray 22 receives an ice-cream sandwich serving receptacle 30 therein.

The receptacle 30 and the holder tray 22 have slightly downwardly tapered sides to assist in guiding dispensed wafers into the receptacle.

An actuation handle 32 is operatively secured to the receptacle holder tray 22 for reciprocation of the tray on the rods 26 between a first position located vertically beneath the dispensing means 20 and a second position horizontally remote from the first position, as seen in FIG. 1 through an intermediate position.

Reciprocation of the tray 22 between the two positions allows ease of assembly of an ice-cream sandwich as may be seen from the description of the operation of the device illustrated in FIGS. 1 to 4 below.

The dispensing means 20 is constructed to allow dispensing of one wafer 18 only from the stack 16 when the receptacle holding tray 22 moves into its first position and to prevent the dispensing of wafers from the stack 16 when the receptacle holding tray 22 moves out of its first position towards its second position.

This is achieved in the illustrated embodiment of FIGS. 1 to 4 by providing first and second opposed pairs of plates 32 and 34 slidably mounted in supporting blocks 35 in the dispensing means 20 for horizontal movement of the members of each pair towards and away from each other.

The pairs of plates 32 and 34 are located vertically above each other and are vertically spaced apart slightly more than the thickness of a wafer 18. The upper pair of plates 32 has opposing edges 36 which are sloped downwardly, as may be seen in the cross sections of FIGS. 2 to 4.

Each of the members of the pairs of plates 32 and 34 includes an elongate slot 38 extending perpendicularly from the rearward edge thereof, with the slots 38 of the vertically adjacent members aligning with each other and a similar elongate slot 40 formed in the lower part of the dispensing means frame 21.

Flanges 42 extend upwardly from each member of the upper pair of slidable plates 32 adjacent the slot 38 therein while similar flanges 44 extend downwardly from each member of the lower pair of slidable plates 34 adjacent the slot 38 therein and through the slot 40.

The vertically adjacent members of each pair of plate members 32 and 34 is joined by an arm member 46 which is pivotally connected at one end to flange 42 by pivot pin 48, is pivotally connected intermediate its ends to flange 44 by pivot pin 50 and depends downwardly.

A roller cam follower 52, which also acts as a weight, is rotatably mounted at the lower end of each of the arm member 46 for engagement with cam elements 54 mounted one each side of the receptacle holder tray 22. Each of the cam elements 54 is in the form of a horizontally-extending flange having a first sloping cam follower engaging surface 56 and a second flat cam follower engaging surface 58 which is parallel to the tray 22.

Each member of the upper pair of plates 32 is spring biased towards the other by separate spring means 60 and away from each other by separate wire spring means 61. Each member of the lower pair of plates 34 is spring biased towards the other by separate spring means 62, the lower spring 62 being slightly stronger than the upper springs 60 and 61.

The operation of the embodiment of FIGS. 1 to 5 now will be described. The rest position resulting from a previous ice-cream sandwich assembly operation is that illustrated in FIG. 1 and the cross section of FIG. 2, and the sequence of steps involved in the assembly of an ice-cream sandwich and return to the rest position now will be described.

In the rest position, one wafer 18 rests on the upper surface of the lower pair of plates 34 which are biased towards each other by the springs 62, and the remainder of the stack 16 rests on this lower wafer.

An ice-cream sandwich receptacle 30 is positioned in the tray 22 and the tray 22 is slidably moved towards the frame plate 12 on the rods 26 until the cams 54 engage the cam followers 52. As the cam followers 52 move up the inclined cam surface 56 and are forced outwardly thereby, the position illustrated in the cross section of FIG. 3 is attained. Thus, as the cam followers 54 are forced outwardly, the arm 46 tends to pivot first about the lower pivot 50 causing movement of the upper pair of plates 32 towards each other under the influence of the springs 60 against the springs 61, owing to the greater spring power of the lower springs 62, while the lower plates 34 remain stationary, to grip the longitudinal edges of the wafer 18 located immediately above the lowest wafer resting on the lower plates 34, the inclined surface 36 assisting by biasing the gripped wafer slightly upwardly and preventing it from accidentally slipping downwardly from between the plates 32. Owing to the frangible nature of the edible wafers 18, the gripping achieved in this manner must be gentle but firm and the action of springs 60 and 61 achieves suitable gentle but firm gripping. Once the edgewise gripping of the wafer 18 has been established, the upper pins 48 become the pivot points so that the lower plates 34 move away from each other against the biasing action of the springs 62 while the upper plates 32 remain stationary.

Figure 4:
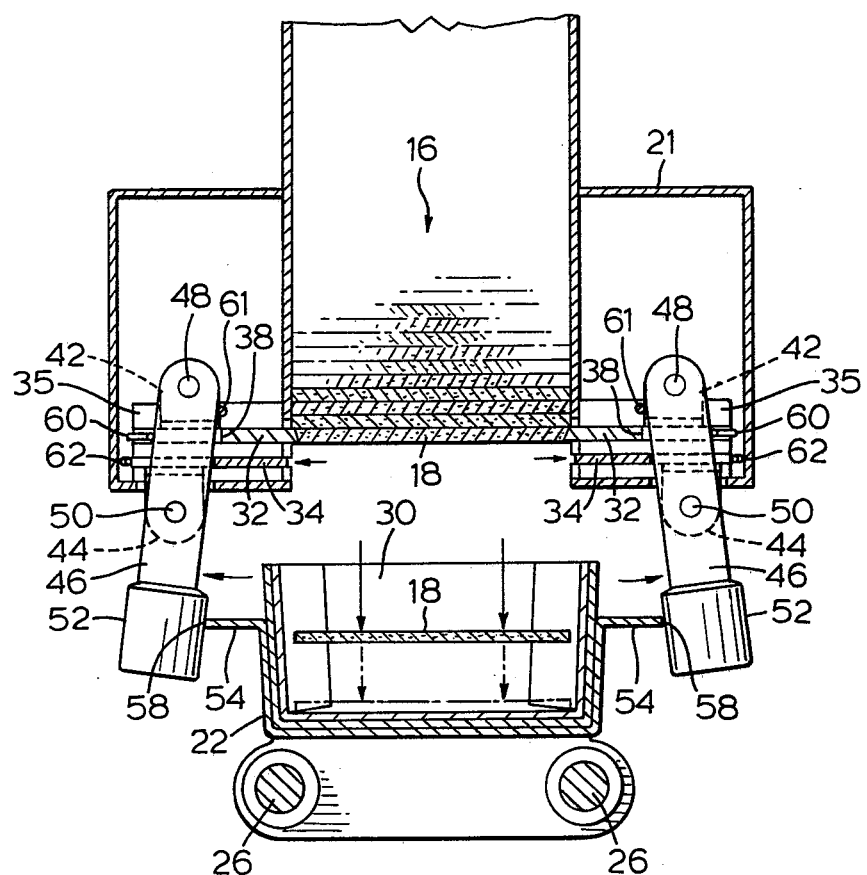
FIG. 4 is the same section as FIG. 2 with the receptacle holding tray located beneath the dispenser.

The latter movement continues until the cam followers 52 engage the flat portion 58 of the cam 54 when the position illustrated in FIG. 4 is reached and the lower plates 34 are displaced their maximum distance which is designed to be sufficient to allow the lowest wafer 18 to fall into the receptacle 30 which is located, at that stage immediately below the dispensing means 20. The edgewise grip on the next higher wafer 18 by the upper plates 32 prevents that wafer and hence any other wafers 18 from the stack 16 to be dispensed to the receptacle 30 at the same time.

The holding tray 22 next is withdrawn to its original location allowing the reverse procedure to occur. Thus, as the cam followers 52 move down the inclined cam surface 56 under the biasing action of the lower springs 62 and the weight of the cam followers 52, the lower plates 34 move towards each other until restored to their original position while the upper plates 32 remain stationary, and then the arms 46, under the influence of the lower springs 62, springs 61 and gravity, move the upper plates 32 away from each other to release the grip on the lowest wafer 18 while the lower plates 34 remain stationary, so that upon disengagement of the cam 54 and cam followers 52, the released wafer falls onto the upper surface of the lower plates 34 and the position illustrated in the cross section of FIG. 2 is restored.

Next the ice-cream block is positioned on the first dispensed wafer in the dispenser 30 and the operation then is repeated for the top wafer of the sandwich. The dispenser 30 containing the resulting sandwich is removed from the holding tray 22 for handing to the customer.

Turning now to the embodiment of FIGS. 5 to 7, there is illustrated a portable wafer dispenser which employs a simplified dispensing mechanism from that illustrated in FIGS. 1 to 4.

A dispensing device 110 includes a wafer stack holding chute 112 containing a stack 114 of horizontally-extending individual rectangular edible wafers in face abutting relationship.

The chute 112 extends upwardly from a box-like frame member 116. The frame member 116 has upper horizontally extending planar portions 118 and 120, downwardly depending skirt portions 122 and 124 and end closures 125.

Spaced rectangularly cross sectioned support blocks 126 and 128 are secured to the underside of the planar portions 118 and 120 respectively and extend along the longitudinal edges of the lower end of the chute 112 between the end closures 125. Vertically spaced horizontal bores 130 and 132 are provided laterally, through each of the blocks 126 and 128, terminating at the inboard ends in elongate recesses 133 and 135 respectively.

An elongate pin 134 is received in each of the bores 132, is attached at one end of the bore to an elongate bar 136 received in the recess 135 and extends towards the adjacent skirt portion 122 and 124 at the other end thereof. Each of the elongate pins 134 is biased outwardly towards the adjacent skirt portions 122 and 124 by a compression spring 138 surrounding the pin 136 and engaging at one end a collar 140 attached to the pin 134 and at the other, the block 126 or 128.

An elongate pin 142 is received in each of the bores 130. Each elongate pin 142 is received in sliding fit with a tubular member 144 which is attached at the inner end of the bore 130 to an elongate bar 146 received in the recess 133. The upper edge of bars 136 and the lower edge of bars 146 are vertically spaced approximately the thickness of one of the wafers of the stack 114. A compression spring 148 is situated in the bore 144 in engagement at one end with the pin 142 and at the other end with the elongate bar 146.

Each of the the pins 142 is biased outwardly by a compression spring 150 surrounding the pin 142 and engaging at one end a collar 152 attached to the pin 142 and at the other end, the block 126 or 128.

Elongate vertically-extending actuation members 154 and 156 are mounted in slots in the frame member 116 for vertical reciprocation relative and adjacent to the skirt members 122 and 124 against the downward biasing action of wire springs 158. Horizontally-extending flanges 159 are provided at the upper ends of each of the actuation members 154 and 156 to act as stops limiting the movement in one vertical direction.

A cam element 160 in the form of an elongate raised portion of the surface of each of the actuation members 154 and 156 having ramp members at each vertical end thereof is provided normally in engagement with the projecting end of the elongate pin 134 remote from the bar 136 and biasing the same inwardly of the bore 132 against the action of the compression spring 140 to project the bars 136 towards each other, while the projecting end of the pin 142 remote from the spring 148 engages the land portion or the lower end of a ramp of the actuation member 154 or 156.

In the latter position, as may be seen in the sectional view of FIG. 6, the bars 136 extend underneath and support the lowest wafer of the stack 114 preventing wafers from falling downwardly from the stack 114.

Upon pushing the body of the device 110 downwardly on horizontally-extending flanges 162 formed at the lower end of each of the members 154 and 156 abutting a solid surface, the frame 116 slides downwardly relative to the actuation members 154 and 156 against the action of the wire springs 158, causing the outer ends of the pins 142 to ride up the ramp at the upper end of the cams 160 against the biasing action of the springs 150. This inward motion of the pins 142 and the resultant biasing action of the spring 148 causes the bars 146 to move inwardly into edge gripping relationship with at least the next-to-lowest wafer of the stack 114. The spring 148 cushions the force of the inward motion of the pins 142 on the frangible wafers, so that a gentle but firm edge gripping of the wafers is achieved.

In the meantime, the outer ends of the pins 134 ride down the lower ramp of the cams 160 under the influence of the biasing springs 138, so that the bars 136 commence to move outwardly from beneath the lowest wafer of the stack 114.

These actions continue until the outer ends of the pins 134 engage a land portion of the actuation members 154 and 156 and the outer ends of the pins 142 engage the cams 160, and the bars 136 thereby are fully retracted from beneath the lowest wafer allowing it to fall into a receptacle 162 positioned beneath the stack 114 while the edge gripping of at least the next lowest wafer by the bars 146 prevents any other wafers from falling from the stack, as shown in FIG. 7.

Upon release of the downward pressure on the frame member 116, the wire springs 158 urge the unit towards the original position (FIG. 6). As the frame member 116 is biased upwardly, the ends of the pins 134 ride up the lower ramp of the cams 160 causing inward movement of the pins 134 against the biasing of the springs 138 and consequential inward movement of the bars 136 to beneath the stack 114. In the meantime, the ends of the pins 142 commence to move outwardly under the biasing action of the springs 142 and 148 as the pin rides down the upper ramp of the cam 160, until the biasing action of the springs 148 is released sufficiently to permit release of the edge gripping action of the plates 146, thereby allowing the stack 114 to fall onto the plates 136.

After the positioning of an ice-cream block on the first-dispensed wafer in the receptacle 162, the procedure is repeated to dispense a second wafer onto the top of the ice-cream block.

The embodiment of FIGS. 5 to 7, therefore, represents a readily portable form of the invention allowing the dispensing of one wafer at a time from a stack of such wafers for use in the hygienic assembly of ice-cream sandwiches.

Figure 8:
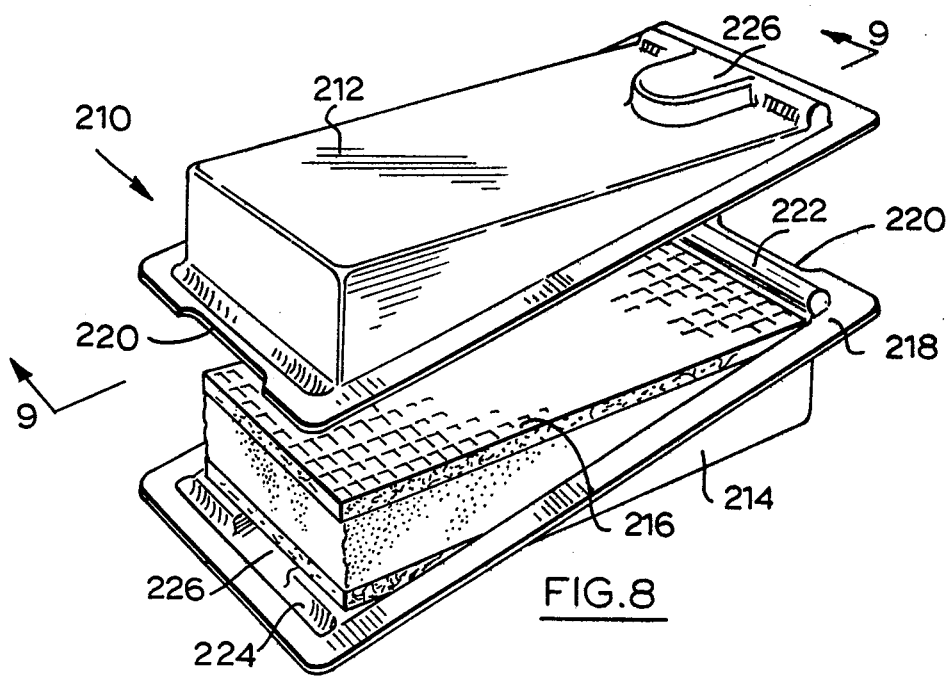
FIG. 8 is an exploded perspective view of a package enclosing an ice-cream sandwich.
Figure 9:
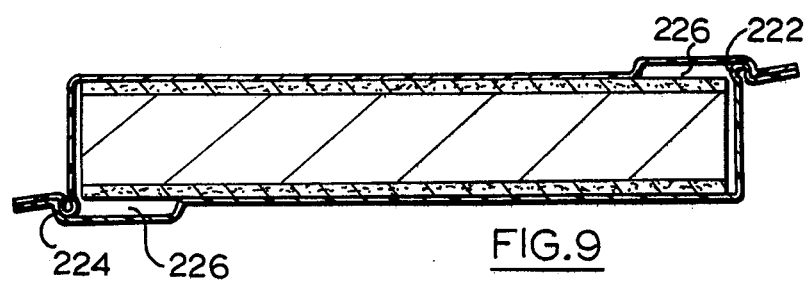
FIG. 9 is a sectional view taken on line 9—9 of FIG. 8 in assembled condition.

FIGS. 8 and 9 illustrate a package for storage and dispensing of ice-cream sandwiches. As seen therein, the package 210 comprises two identical parts 212 and 214 which are capable of releasable interlock one with another to form an enclosure for storage of an ice-cream sandwich 216. One of the parts may be used as the receptacle 30 in the embodiment of FIGS. 1 to 4 or the receptacle 162 in the embodiment of FIGS. 5 to 7. Once the ice-cream sandwich has been formed using the apparatus of FIGS. 1 to 7, the other part is mated with the first to form the enclosured package 210.

The package parts 212 and 214 preferably are formed of closed-cell foamed plastic material, such as foamed polystyrene, to provide heat insulation to the package 210, thereby inhibiting melting of the ice-cream block on standing of the package 210 at ambient temperatures over an extended period of time.

The identical package parts 212 and 214 include a triangularly cross sectioned body which at its deepest part is deep enough to accommodate the ice-cream sandwich 216 and a peripheral outwardly-projecting flange 218 around the free edges, the peripheral flanges of the package parts abutting each other on assembly of the package 210, as may be seen in FIG. 9.

The lateral portion of the peripheral flange 218 of the package parts 212 and 214 adjacent the deepest part of the body is cut-away at 220 to allow ready separation of the parts 212 and 214 of a closed package.

An elongate protrusion 222 is formed parallel with the cut-away 220 at the internal edge of the flange 216 and a cooperating elongate recess 224 is provided parallel with the other lateral portion of the flange 216 at the internal edge thereof.

The protrusions 222 and the recesses 224 are formed and dimensioned to snap-fit one with another to achieve releasable locking of the package parts together to form the enclosed package 210.

A recess 226 is provided extending longitudinally of each of the package parts and terminating at its forward end at the elongate recess 224. The recesses 226 serve to allow the insertion of a portion of a digit under the ice-cream sandwich 216 upon opening of the package 210 to assist in removal of the ice-cream sandwich 216 from the appropriate package part. The recesses 226 also allow chips from any melted ice-cream to be collected away from the sandwich.

Figure 10:
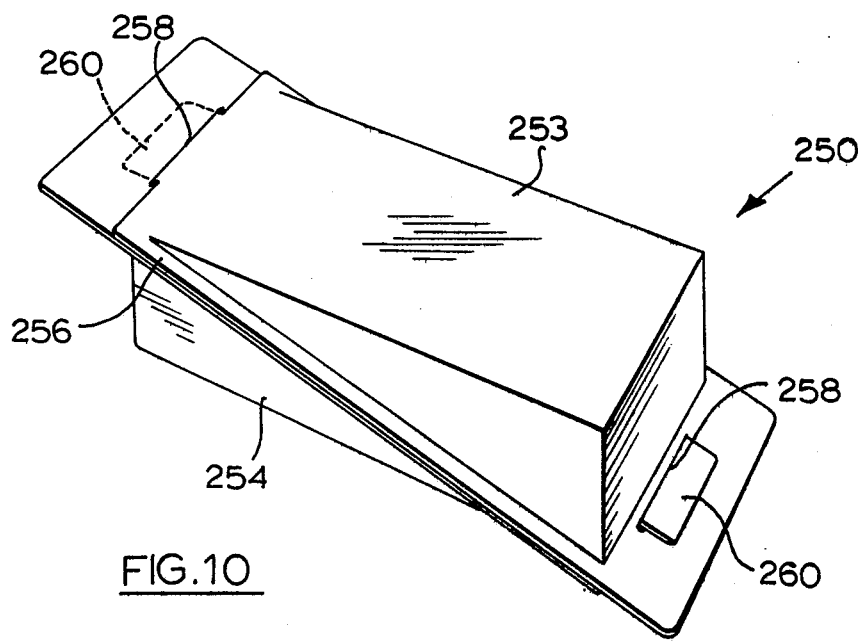
FIG. 10 is a perspective view of an alternative form of package.

The embodiment of FIG. 10 is similar to that described above in connection with FIGS. 8 and 9, in that the package 250 comprises two interfitted identical parts 252 and 254. Each of the parts has a triangularly cross-sectioned body and a peripheral outwardly-projecting flange 256 which abut each other on assembly of the package 250.

The lateral portion of the peripheral flange 256 adjacent the deepest part of the body is provided with an elongate slot 258 while the lateral portion of the peripheral flange 256 at the other end of the body part is provided with a tab 260 which is received within the slot 258 of the other body part on assembly of the package.

The operation of formation of the ice-cream sandwich by the procedure using the embodiment of FIGS. 1 to 4 or that using the embodiment of FIGS. 5 to 7 is very hygienic since the product is substantially untouched by human hands. A wrapper which is removed when it is positioned on the lower wafer may be used on the ice-cream block for maximum protection.

The apparatus of the invention as illustrated in FIGS. 1 to 7 and the method described with reference thereto provides a convenient ice-cream serving system of trouble free operation particularly suitable for use in convenience food outlets.

SUMMARY

The present invention, therefore provides a unique procedure and apparatus for the formation of ice-cream sandwiches. Modifications are possible within the scope of the invention.

What we claim is:

1. An ice-cream sandwich making machine including stack holding means for holding a substantially vertical stack of face-abutting edible wafers of rectangular shape;

dispensing means located at the lower end of said stack holding means for controlled dispensing of said wafers one at a time downwardly from said stack thereof;

said stack holding means being a vertically-aligned chute of cross-sectional dimension substantially that of said wafers and having an open lower end for the feeding of said wafers to said dispensing means;

said dispensing means comprising a box-like frame member having openings in the upper and lower faces thereof for receipt of wafers from said chute and for passage of wafers downwardly through and out of said dispensing means;

said dispensing means further comprising plate support means located in said frame member and first and second pairs of plate means;

each member of said pairs of plate means being mounted for sliding movement in said support means, the individual members of each pair being in horizontal alignment;

one member of the first pair of plates being vertically spaced above the one member of said second pair a distance slightly greater than the thickness of one of said wafers and the other member of the first pair of plates being vertically spaced above the other member of said second pair a distance slightly greater than the thickness of one of said wafers, first spring biasing means operatively associated with each member of said first pair of plates for biasing said first pair of plates towards each other to suspend said stack of wafers, spring engaging means engaging said first spring biasing means at the end thereof remote from said first pair of plates, second spring biasing means operatively associated with each of said spring engaging means for biasing said spring engaging means away from each other and the respective member of said first pair of plates to cushion the force applied to said first pair of plates by said first spring biasing means upon movement of said spring engaging means into greater biasing relationship with said first spring biasing means, third spring biasing means operatively associated with each member of said second pair of plates normally biasing said second pair of plates away from each other; and actuation means operably associated with said dispensing means.

2. The machine of claim 1, including first and second pairs of horizontally-extending lateral bores formed through said block members in opposed relationship, and wherein said first spring biasing means is received within a sleeve connected to the respective members of said first pair of plates and received in sliding relationship with one of said first pair of bores, said spring engaging means comprise first pins received in sliding relationship one with each of said first pair of bores and with said sleeve, and said third spring biasing means surrounds second pins received in sliding relationship one with each of said second pair of bores and attached one to one member of said second pair of plates.

3. The machine of claim 2 including a pair of vertical actuation members slidably mounted in said frame means for vertical reciprocation with respect thereto, fourth spring means operatively associated with each of said actuation members normally biasing said members downwardly with respect to said frame means, and cam means formed in each of said vertical members and arranged to operate said dispensing means, said cam means being constructed normally to engage the end of the respective one of said second pins remote from said second plate means to position said first plate members below the lower-most of said stack of wafers and upon vertical downward movement of said frame means relative to said vertical members, said cam means engages the end of the respective one of said first pins remote from said first spring means to cause said first plate means to grip the longitudinal edges of at least the wafer located immediately above said lower-most wafer of said stack and moves out of engagement with said ends of said second pins to allow said second pair of plates to move away from each other under the biasing influence of said third spring means to allow said lower-most wafer to fall into a receptacle while the remainder of said stack is prevented from downward movement by said edge gripping, and upon vertical upward movement of said frame means relative to said vertical members under the restorative influence of said fourth spring means said cam means engages said ends of said second pins to cause said second pair of plates to move towards each other to a position vertically beneath said stack and moves out of engagement with said ends of said first pins to allow said first pair of plates to move out of said edge gripping relationship under the biasing influence of said first and second spring means and allow the gripped wafer and the stack to fall into said second pair of plates.

4. The machine of claim 3 wherein said cam means comprises a protrusion from the surface of each of said vertical members having ramps at each vertical end thereof communicating the protrusion with the remainder of the respective vertical member.

* * * * *